United States Patent [19]
Nomura

[11] 3,936,347
[45] Feb. 3, 1976

[54] PAPER COMPOSED MAINLY OF PULLULAN FIBERS AND METHOD FOR PRODUCING THE SAME

[75] Inventor: Tatsuo Nomura, Okayama, Japan

[73] Assignees: Sumitomo Chemical Company Limited, Osaka; Hayashibara Biochemical Laboratories, Incorporated, Okayama, both of Japan

[22] Filed: Sept. 3, 1974

[21] Appl. No.: 502,860

[30] Foreign Application Priority Data
Sept. 5, 1973 Japan............... 48-99903

[52] U.S. Cl.............. 162/146; 162/157 R; 162/177; 195/31 P; 426/415
[51] Int. Cl.².......................... D21H 5/12
[58] Field of Search............. 162/157 R, 146, 177; 195/31 P; 426/415, 84

[56] References Cited
UNITED STATES PATENTS

| | | | |
|---|---|---|---|
| 3,034,922 | 5/1962 | Boe.................... | 162/100 |
| 3,245,871 | 4/1966 | Yang................... | 162/177 |
| 3,431,166 | 3/1969 | Mizutani et al........ | 162/146 X |
| 3,436,311 | 4/1969 | Ferguson et al........ | 195/31 P X |

FOREIGN PATENTS OR APPLICATIONS
2,147,112  9/1973  France

OTHER PUBLICATIONS
Chemical and Engineering News, Vol. 51, No. 52, p. 46.

Primary Examiner—Robert L. Lindsay, Jr.
Attorney, Agent, or Firm—Stevens, Davis, Miller & Mosher

[57] ABSTRACT

A specific paper, which is soluble in and easily destroyable with water, is obtained by subjecting to papermaking a suspension of fibers of pullulan, which is a linear high polymer having repetition units, bonded through α-1,6-linkages, of maltotriose, a trimer of glucose, and has a structure represented by the formula,

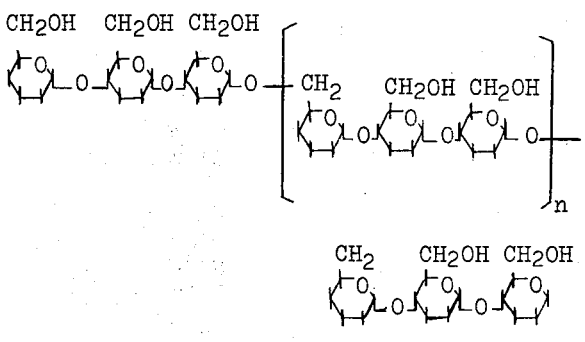

wherein $n$ is an integer of 20 to 10,000 which represents the polymerization degree, or, if necessary, a suspension of said pullulan fibers in admixture with vegetable fibers such as wood fibers, flax or ramie fibers.

15 Claims, No Drawings

PAPER COMPOSED MAINLY OF PULLULAN FIBERS AND METHOD FOR PRODUCING THE SAME

This invention relates to a novel paper. More particularly, the invention pertains to a specific paper composed mainly of pullulan fibers, and to a method of producing the same.

The specific paper of the present invention is soluble in and easily destroyable with water, and is produced by subjecting to papermaking a suspension of pullulan fibers which are soluble in water, edible, and non-digestible in the digestive organs of man, or a suspension of said pullulan fibers in admixture with vegetable fibers such as wood fibers (pulps), flax or ramie fibers.

Specific papers of this kind have heretofore been proposed as papers for secret documents, but there has never been proposed a paper obtained, like the paper of the present invention, from natural carbohydrate fibers which are quite quickly soluble in water, edible, and non-toxic and non-digestive to man.

An object of the present invention is to provide a novel paper composed of pullulan fibers, or a mixture of pullulan fibers and vegetable fibers.

Another object of the invention is to provide a method for producing the said novel paper.

Other objects and advantages of the invention will become apparent from the explanation given below.

Characteristic features of the present invention are as follows:

1. The starting pullulan used for production of the paper of the present invention is a natural polysaccharide capable of being produced in large quantities by cultivation of microorganisms, and hence can be obtained at a relatively low cost.

2. Since the starting pullulan is high in water solubility, the paper of the present invention is quickly dissolved when dipped in water, or is destroyed when discarded in the fields, and hence is usable as a paper for secret documents.

3. Since the starting pullulan is decomposable by microorganisms existing in nature, no direct or indirect public pollution is brought about by the paper of the present invention.

4. Since the starting pullulan is edible, non-digestive, and water-soluble, the paper of the present invention, when used as internal packaging materials for medicines in the form of powders or tablets, or for instant food seasonings, powdered tea, coffee and the like foods, is not required to be removed at the time when the said medicines or foods are taken or served.

5. Since the starting pullulan can be freely processed into fibers of various forms, fibers of any form suitable for application purpose of the final paper can be provided.

6. The pullulan paper of the present invention is high in strength and folding resistance, is more tough than a wood pulp paper, and requires no particular paste or size.

7. The pullulan paper of the present invention, because of its high hydrophilic property, is not only favorable in ink receptivity but also not blurred with inks, and hence is suitable for printing and writing.

8. The pullulan paper of the present invention is heat-sealable and hence can be processed with extreme ease.

The pullulan used in the present invention is a linear high polymer having repetition units, bonded through $\alpha$-1,6 linkages, of maltotriose, which is a trimer of glucose, and has a molecular structure represented by the formula,

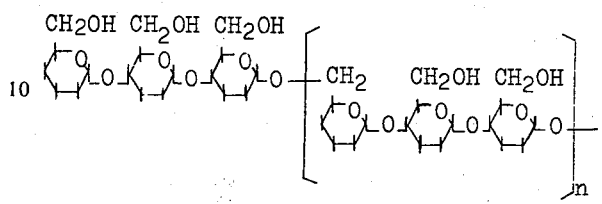

wherein $n$ is an integer of 20 to 10,000 which represents the polymerization degree.

The pullulan is merely known as a water-soluble slime, and the physical properties or uses thereof have not been studied extensively hitherto. In this sense, the pullulan is equal to an unknown compound, in practice.

The pullulan is a linear compound that is different in molecular structure from other polysaccharides such as starch, and hence can be synthesized by a chemical process or other process using an enzyme. At present, however, it is obtained as a slime secreted in a culture liquor from a strain belonging to the species *pullularia pullulans* which is an incomplete microorganism [H. Bender, J. Lehmann et al.: Biochem. Biophys. Acta, 36, 309 (1959); Seinosuke Ueda: Kogyo Kagaku Zasshi (Journal of Industrial Chemistry), 67, 757 (1964)].

The pullulan is produced by a process comprising incubation of pullulan-producing strains on an aqueous medium containing as a carbon source oligosaccharides and/or dextrin, i.e., partially hydrolyzed starch having dextrose equivalent (hereinafter referred to as DE) of 20 – 70 which is obtained by acidic or enzymatic hydrolysis of starch as disclosed in Japanese Patent Application laid-open Nos. 44492/73 and 42894/74.

The employable pullulan-producing strains includes various strains which belong to genus Pullularia such as *Pullularia fermentans* var fermentans IFO 6401, *Pullularia fermentans* var fusca IFO 6402, *Pullularia pullulans* AHU 9553, *Pullularia pullulans* IFO 6353, *Pullularia pullulans* IFO 4464 etc. The strains should be selected to obtain pullulan with suitable polymerization degree according to its specific applications.

Starches employable as the carbon sources include the cereal starches such as corn maize, waxy maize, and wheat starches, and the root or tuber starches such as sweet potato, potato and tapioca starches.

Employable partially hydrolyzed starch syrups include those produced by acidic or enzymatic hydrolysis of purified starches. Products having the DE in the range of 20 – 70 may be used, preferably in the range of 35 – 60.

The employable concentrations of the partially hydrolyzed starch syrups in the culture media are in the range of 3 – 30 %. However, in view of the yield of pullulan, the range of 5 – 15 % is preferable.

Employable nitrogen sources in the culture media include common organic or inorganic nitrogen compounds. Common inorganic salts such as potassium phosphate, sodium chloride, magnesium sulfate, ferrous sulfate, etc. are also employed. The preferable initial pH should lie in the range of 5.0 – 7.5 and the suitable incubation temperature range is 24° – 30°C. Three to 8 days are required for incubation and the highest pullulan yield is attained at the point when no residual sugar remains in the culture liquor.

After completion of the incubation, the solution is heated to inactivate the enzyme used and the cells are removed from the solution by contrifugation. Thereafter pullulan may be recovered from the solution by precipitation with the addition of an organic solvent such as methanol etc. in an equivalent amount or more to that of the solution (volume/volume). The recovered pullulan is purified by repeating dissolution in water and precipitation with the organic solvent and then dried to obtain pullulan powder.

The pullulan is white, tasteless and odorless powder, and the degrees of decomposition thereof with various digestive enzymes are one several tenth the degrees of starch. Further, the molecular weight of the pullulan can be controlled by varying the pH or phosphate concentration of the medium (Japanese Patent Application Laid-open No. 42894/74).

The molecular weight of the pullulan used in the present invention is not particularly limited, but is preferably 10,000 to 5,000,000, more preferably 50,000 to 1,000,000.

An example of the precedure for production of pullulan is as follows:

A strain, *Pullularia pullulans* IFO 6353 is subjected to shaking culture at 24°C. for 5 days in a medium containing 10 % of partially hydrolyzed starch, 0.5 % of $K_2HPO_4$, 0.1 % of NaCl, 0.02 % of $MgSO_4 \cdot 7H_2O$, 0.06 % of $(NH_4)_2SO_4$ and 0.04 % of yeast extract. The culture liquor is freed from the cells by centrifugation, and the supernatant is charged with methanol to form a pullulan precipitate. After repeating water-dissolution and methanol-precipitation, white pullulan is separated, washed with methanol and dried, whereby dry pullulan is obtained in a yield of 60 to 70 % based on the amount of the starch.

For preparation of papermaking fibers from pullulan, there may be adopted various processes. For example, powders or flakes of hydrous pullulan having a water content of more than 10 % are extruded through fine orifices while heating and melting at 80° to 160°C. and then dry-cooled, whereby long pullulan fibers are obtained. The thus obtained fibers are cut to a proper length to obtain short pullulan fibers. Alternatively, a 5 to 15 % aqueous solution of pullulan is charged, under vigorous stirring, with more than an equivalent of a hydrophilic organic solvent such as acetone, or a lower alcohol such as methanol or ethanol, whereby pullulan is deposited as a fibrous white precipitate, which is then separated by filtration or centrifugation. The said precipitate is an aggregate of fine pullulan fibers, and is insoluble in organic solvents.

The papermaking operation in the present invention is carried out according to an ordinary procedure, and the concentration of the starting fibers is preferably about 0.3 to 1.0 %. Since the starting fibers are water-soluble pullulan fibers, either one or a mixture of a hydrophilic lower alcohol such as methanol, ethanol or isopropanol, and a hydrophilic organic solvent such as acetone, is used as a dispersion medium at a concentration of 60 to 100 % to homogeneously disperse the fibers.

What is to be noted in the papermaking of the pullulan fibers is that the pullulan fibers are water-soluble, and hence are extremely weak and are extremely weak and are easily damaged in a hygroscopic and swollen state. It is to be also noted that the pullulan fibers adhere to one another when properly heated and pressed in a hygroscopic state, and hence are not required to possess any entangling properties, but if the heating and pressing are excessive, the fibers completely adhere to form a film. Accordingly, the papermaking operations should be conducted with care while paying sufficient attention to the above-mentioned points. That is, in the beating step, the pullulan fibers, particularly those precipitated from an aqueous pullulan solution, should be beaten to a minimum extent necessary to disperse the fibers uniformly, which extent may be attained by vigorous stirring. Further, the fiber dispersion is flowed on a papermaking wire screen in an amount corresponding to the weight of the resulting paper, and water in the paper web is drained as much as possible so that the amount of the fibers in the paper web before a couch roll becomes about 10%. Subsequently, the water in the paper web is removed as completely as possible by means of squeeze rolls to bring the fiber content of the paper web before drying cylinders to about 40 %, and the drying cylinder temperature is gradually elevated up to a final temperature of about 90°C. It is particularly necessary that the water removal with the squeeze rolls is conducted completely, so that a major portion of the drying is completed by elevating the temperature of the drying rolls to about 20° to 60°C. The resulting paper, which has been decreased in water content to about 15 %, is then passed through the final calender rolls, and the extents of heating and pressing are properly controlled so as not to become excessive. If the paper is strongly pressed at a temperature higher than 100°C., there arises such danger that it is formed into a film.

The pullulan fibers used in the present invention are short pullulan fibers obtained by the aforesaid melt spinning, pullulan fibers formed from an aqueous pullulan solution by use of a hydrophilic organic solvent, or pullulan fibers prepared by any other suitable processes. When heated and pressed by means of a papermaking machine, these pullulan fibers form a tough paper without addition of any particular size or paste. In this case, the pullulan fibers may be subjected to papermaking in admixture with vegetable fibers such as wood fibers in a proportion of 10 to 80 % of the total fibers. Depending on the use purpose of the final paper, the pullulan fibers may be freely mixed with wood pulps, flax or ramie fibers, but in case the pullulan fibers are mixed with large quantities of wood fibers, it is desirable to add a suitable size.

The paper produced by the present invention is tough and elastic. While the paper is somewhat low in folding resistance when produced from only the pullulan fibers, the elasticity of the paper can be controlled by incorporating into the fibers 1 to 40 % by weight of a polyhydric alcohol such as glycerin, ethylene gylcol, sorbitol, propylene glycol or maltitol as a plasticizer. Further, the folding resistance of the paper can be increased by blending the pullulan fibers with vegetable fibers such as wood fibers.

The pullulan paper of the present invention which is produced from the pullulan fibers, or a mixture thereof with vegetable fibers, is similar in texture to a Japanese paper and is free from uneven sheeting or nap. The surface smoothness and gloss of the paper can be controlled by controlling the pressure and temperature of calender rolls.

The pullulan paper of the present invention is not only favorable in printing ink receptivity and causes no picking at the time of printing, but also is smoothly writable with writing inks and pencils without being blotted or penetrated with inks. Further, the present pullulan paper is far more quickly soluble in water than a water-soluble paper composed of polyvinyl alcohol or the like or other starch film, and swells and dissolves within several seconds when dipped cold water. This dissolving speed is several times higher than that of said polyvinyl alcohol paper or starch film. Moreover, pullulan is non-toxic and scarcely attacked by digestive enzymes. Accordingly, even when foods or medicines packaged with the present pullulan composed only of the pullulan fibers are taken as they are, the paper not only dissolves immediately but also provides no calorie and hence is freely usable as materials of packaging foods or medicine for even diabestics. Further, the present pullulan paper is several times higher in quick water solubility than other similar paper or film, and hence may be used for specific purpose such as a paper for secret documents which, after use, may be dissolved in water. Even when the paper contains wood fibers, there is no such fear at all that public pollution is caused later, because the wood fibers are completely destroyed.

As mentioned above, the paper composed only of pullulan fibers can be used as a paper for packaging or enveloping medicines or instant foods, while the paper composed of pullulan and vegetable fibers can be used as a paper for secret documents or securities. Further, the said papers, as being high in water solubility, can be used as substitutes for toilet papers, tissue papers and women's sanitary cotton, and can advantageously be discarded without any public pollution.

The present invention is illustrated in detail below with reference to examples, but the invention is not limited to the examples.

EXAMPLE 1

Preparation of pullulan fibers

*Pullularia pullulans* IF) IFO 4464 was used as pullulan-producing strain. For the cultivation of the stains, a culture medium comprising the following composition was prepared. As a carbon source, enzymatic hydrolyzed starch syrup (DE 40) was used.

Composition of the culture medium:

| | |
|---|---|
| Carbon source | 10 % |
| $K_2HPO_4$ | 0.2 % |
| Peptone | 0.2 % |
| NaCl | 0.2 % |
| $MgSO_4.7H_2O$ | 0.04 % |
| $FeSO_4.7H_2O$ | 0.001% |

100 ml of the medium with the above composition was placed in a 500 ml flask and sterilized by heating according to the usual method.

Strains obtained by slant-cultures for 2 days and then by seed-culture for 2 days were inoculated on the medium placed in the flask, and then was cultivated in a rotary shaker at 27°C., with pH 7.5 under a vigorous stirring for 5 days.

The resulting viscous liquor was centrifuged to precipitate and remove the cells, decolored by addition of 0.5 % by weight, based on the weight of the liquor, of active carbon, and then filtered to obtain a transparent colorless liquid. To this liquid, 2 times the volume of the liquid of isopropanol was added with vigorous stirring, whereby a white fibrous pullulan precipitate is deposited. This precipitate was recovered by filtration to obtain 65 %, based on the starting starch, of pullulan (after drying) having an average molecular weight of 250,000. The thus obtained wet pullulan fibers are referred to as "pullulan fibers A," hereinafter.

The pullulan fibers A were decreased in water content to 15 % and then powdered, and the resulting powder was extruded, by use of a heat-kneading type spinning machine, through fine orifices at a temperature of 100° to 160°C. under a pressure of 100 to 150 $kg/cm^2$ and stretched to obtain fine pullulan fibers, which were then cut to a length of 5 to 10 cm. to prepare short pullulan fibers. The thus prepared short pullulan fibers are referred to as "pullulan fibers B," hereinafter.

EXAMPLE 2

The pullulan fibers A obtained in Example 1 were dispersed in a 90 % aqueous acetone solution to a concentration of 0.5 %, and the resulting dispersion was sufficiently stirred to prepare a homogeneous dispersion. This dispersion was subjected to a Fourdrinier machine. That is, the dispersion was flowed on a wire screen and sufficiently drained, with vibration, to a concentration of about 9 % to form a paper web. The paper web was repeatedly dehydrated by means of squeeze rolls to a concentration of about 39 %, thereafter dried with drying rolls and hot air at 30° to 40°C. and finally dried at a temperature of 80°C. to obtain a paper having a water content of 15 %.

The thus obtained paper had a thickness of 0.1 mm., was high in flexibility, had a surface similar to that of a Japanese paper, was suitable for writing with pens and pencils, and was not penetrated nor blotted with inks.

EXAMPLE 3

A mixture comprising 2 parts of the pullulan fibers A obtained in Example 1 and 1 part of wood cellulose pulp was suspended in a 80 % aqueous acetone solution to a concentration of 0.3 %, and the resulting suspension was sufficiently stirred to prepare a homogeneous suspension. This suspension was subjected to papermaking treatment according to the procedure of Example 2 to obtain a paper, which was then treated with final calender rolls at 80°C. to make the surface thereof somewhat glossy.

The thus obtained paper had a thickness of 0.1 mm., showed such excellent properties as an elongation of 1.5 in lengthwise direction and 2.6 in widthwise direction, a tearing strength of 2.5 $kg/cm^2$, and a folding strength of 980 in lengthwise direction and 560 in widthwise direction, was high in flexibility, had a smooth but less glossy surface, and was similar in texture to a Japanese paper. The paper was favorable in printing ink receptivity, and was not blotted nor penetrated with inks.

When charged in stationary cold water, the paper lost its original shape within 8 seconds and formed a suspension of wood pulp.

EXAMPLE 4

The pullulan fibers B obtained in Example 1 were sprayed with one-third the weight thereof of a 80 % aqueous maltitol solution, and then allowed to absorb the solution for 10 hours. Thereafter, the fibers were homogeneously suspended in 250 times by volume, based on the weight of said fibers, of pure methanol to prepare a homogeneous suspension. This suspension was sufficiently drained and dehydrated in the same manner as in Example 2, and the resulting paper web was sufficiently dried with air, gradually heated, and then subjected to final rolls at 80°C. to obtain a paper having a water content of 14 %.

The thus obtained paper was relatively flexible, had a thickness of 0.08 mm., and showed such excellent properties as a folding strength of 1150 in lengthwise direction and 630 in widthwise direction, and a tearing strength of 2.1 kg/cm$^2$. Further, the paper was quite quickly and highly soluble in water such that a small bag containing a cocoa powder for a cup of cocoa was prepared by use of said paper, and charged into 130 cc. of hot water, and then the water was stirred, whereby the small bag immediately dissolved and dispersed in the water to give a cocoa liquid containing no residue of the small bag.

EXAMPLE 5

A mixture comprising 1 part by weight of the pullulan fibers B obtained in Example 1 and 1 part by weight of wood pulp was homogeneously suspended in 150 parts by volume of 90 % aqueous isopropyl alcohol solution. The homogeneous suspension thus obtained was subjected to the same papermaking treatment as in Example 2, except that the paper web was dried with drying rolls kept at 55° to 90°C. and passed between calender rolls under a slight pressure.

The resulting paper was relatively bulky but had a smooth surface less in nap and was elastic. When dipped in water, the paper was easily swelled and destroyed, and when subjected to printing or writing, the paper showed excellent ink receptivity and was smoothly printable or writable without penetration of inks.

EXAMPLE 6

Dry pullulan flakes were sprayed with 20 % by weight, based on the weight thereof, of a 80 % aqueous maltitol solution, and then allowed to stand overnight. Thereafter, the flakes were subjected to a melt-spinning machine and melt-extruded at 120°C. to prepare pullulan fibers. The thus prepared fibers were cut to a length of 8 to 10 cm., and the resulting short pullulan fibers were subjected to the same papermaking treatment as in Example 4 to obtain a paper high in folding strength.

What is claimed is:

1. A paper composed of pullulan fibers, or a mixture of 90 to 20% of pullulan fibers with 10 to 80% of vegetable fibers.

2. A paper according to claim 1, wherein the pullulan has a molecular weight of 10,000 to 5,000,000.

3. A paper according to claim 1, wherein the pullulan fibers are short pullulan fibes obtained by melt spinning.

4. A paper according to claim 1, wherein the fibers are obtained by adding a hydrophilic organic solvent to an aqueous pullulan solution.

5. A paper according to claim 1, wherein the vegetable fibers are wood fibers, flax or ramie fibers.

6. A paper according to claim 1, wherein the pullulan fibers are incorporated with 1 to 40 % by weight of a polyhydric alcohol as a plasticizer.

7. A paper according to claim 6, wherein the polyhydric alcohol is glycerin, ethylene glycol, sorbitol, propylene glycol or maltitol.

8. A method for producing a paper, characterized by forming pullulan fibers, either singly or a mixture of 90 to 20% of pullulan fibers with 10 to 80% of vegetable fibers, into a suspension using a hydrophilic organic solvent as a dispersion medium, and subjecting the suspension to papermaking.

9. A method according to claim 8, wherein the pullulan fibers are short pullulan fibers obtained by melt spinning.

10. A method according to claim 8, wherein the pullulan fibers are obtained by adding a hydrophilic organic solvent to an aqueous pullulan solution.

11. A method according to claim 8, wherein the vegetable fibers are wood fibers, flax or ramie fibers.

12. A method according to claim 8, wherein the dispersion medium is one or more of methanol, ethanol, isopropanol and acetone.

13. A method according to claim 8, wherein the concentration of the dispersion medium is 60 to 100 %.

14. A method according to claim 8, wherein the pullulan fibers are incorporated with 1 to 40 % by weight of a polyhydric alcohol as a plasticizer.

15. A method according to claim 14, wherein the polyhydric alcohol is glycerin, ethylene glycol, sorbitol, propylene glycol or maltitol.

* * * * *